US009557819B2

(12) United States Patent
Anderson

(10) Patent No.: US 9,557,819 B2
(45) Date of Patent: Jan. 31, 2017

(54) GESTURE INPUT WITH MULTIPLE VIEWS, DISPLAYS AND PHYSICS

(75) Inventor: Glen J. Anderson, Portland, OR (US)

(73) Assignee: Intel Corporation, Santa Clara, CA (US)

(*) Notice: Subject to any disclaimer, the term of this patent is extended or adjusted under 35 U.S.C. 154(b) by 503 days.

(21) Appl. No.: 13/977,654

(22) PCT Filed: Nov. 23, 2011

(86) PCT No.: PCT/US2011/062140
§ 371 (c)(1),
(2), (4) Date: Jun. 28, 2013

(87) PCT Pub. No.: WO2013/077883
PCT Pub. Date: May 30, 2013

(65) Prior Publication Data
US 2013/0278499 A1 Oct. 24, 2013

(51) Int. Cl.
G06F 3/03 (2006.01)
G06F 3/0481 (2013.01)
(Continued)

(52) U.S. Cl.
CPC .................. G06F 3/017 (2013.01); G06F 3/01 (2013.01); G06F 3/011 (2013.01); G06F 3/0304 (2013.01);
(Continued)

(58) Field of Classification Search
CPC ............. G06F 3/01–3/014; G06F 3/017; G06F 3/048–3/0486; G06F 3/14–3/1446; G09G 2300/02–2300/026; G09G 2360/04; G10L 15/06–15/075; G06T 15/00–15/87; G06T 17/00–17/30; G06T 19/00–19/20
See application file for complete search history.

(56) References Cited

U.S. PATENT DOCUMENTS

2002/0041327 A1 4/2002 Hildreth et al.
2004/0193413 A1* 9/2004 Wilson et al. ................ 704/243
(Continued)

FOREIGN PATENT DOCUMENTS

CN 102 184 020 9/2011
CN 102184020 9/2011
(Continued)

OTHER PUBLICATIONS

PCT Search Report, PCT/US2011/062140, Intel Corporation, Jul. 3, 2012, 11 pages.
(Continued)

Primary Examiner — Nathan Danielsen
(74) Attorney, Agent, or Firm — Blakely, Sokoloff, Taylor & Zafman LLP

(57) ABSTRACT

Gesture input with multiple displays, views, and physics is described. In one example, a method includes generating a three dimensional space having a plurality of objects in different positions relative to a user and a virtual object to be manipulated by the user, presenting, on a display, a displayed area having at least a portion of the plurality of different objects, detecting an air gesture of the user against the virtual object, the virtual object being outside the displayed area, generating a trajectory of the virtual object in the three-dimensional space based on the air gesture, the trajectory including interactions with objects of the plurality of objects in the three-dimensional space, and presenting a portion of the generated trajectory on the displayed area.

33 Claims, 12 Drawing Sheets

(51) Int. Cl.
G06F 3/0484 (2013.01)
G06F 3/01 (2006.01)
G06F 3/14 (2006.01)

(52) U.S. Cl.
CPC ........... *G06F 3/0481* (2013.01); *G06F 3/0484* (2013.01); *G06F 3/14* (2013.01); *G06F 3/1423* (2013.01)

(56) References Cited

U.S. PATENT DOCUMENTS

| | | |
|---|---|---|
| 2004/0239670 A1 | 12/2004 | Marks |
| 2005/0093868 A1 | 5/2005 | Hinckley |
| 2010/0195869 A1 | 8/2010 | Geiss |
| 2010/0241998 A1 | 9/2010 | Latta et al. |
| 2011/0173574 A1 | 7/2011 | Calvin et al. |
| 2011/0175932 A1 | 7/2011 | Yu |
| 2011/0199291 A1* | 8/2011 | Tossell et al. ............... 345/156 |
| 2012/0236025 A1* | 9/2012 | Jacobsen ............. G06F 3/011 345/629 |
| 2012/0295708 A1* | 11/2012 | Hernandez-Abrego et al. ............... 345/156 |

FOREIGN PATENT DOCUMENTS

| | | |
|---|---|---|
| KR | 2011-0117114 | 10/2011 |
| WO | WO 2011004135 A1 * | 1/2011 |

OTHER PUBLICATIONS

English Translation of the Notice of Preliminary Rejection for KR Counterpart Application No. 2014-7017149 5 pgs., (Jul. 17, 2015).
European Search Report for EP Counterpart Application No. 11876258.2, 6 pgs., (Jul. 27, 2015).
Supplementary EP Search Report, EP Application No. 11 87 6258, 21 pages.
Gebhardt, Sascha, et al., MI Hauptseminar Sommersemester 2009 "Interactive Surfaces" *LFE Medieninformatik @Bullet Sasha Gebhardt Superimposed Displays*, XP055249528, Retrieved from the internet: URL:https://www.medien.ifi.lmu.de/lehre/ss09/hs/presentations/02_sascha_gebhardt.pdf, (Jan. 1, 2009).

* cited by examiner

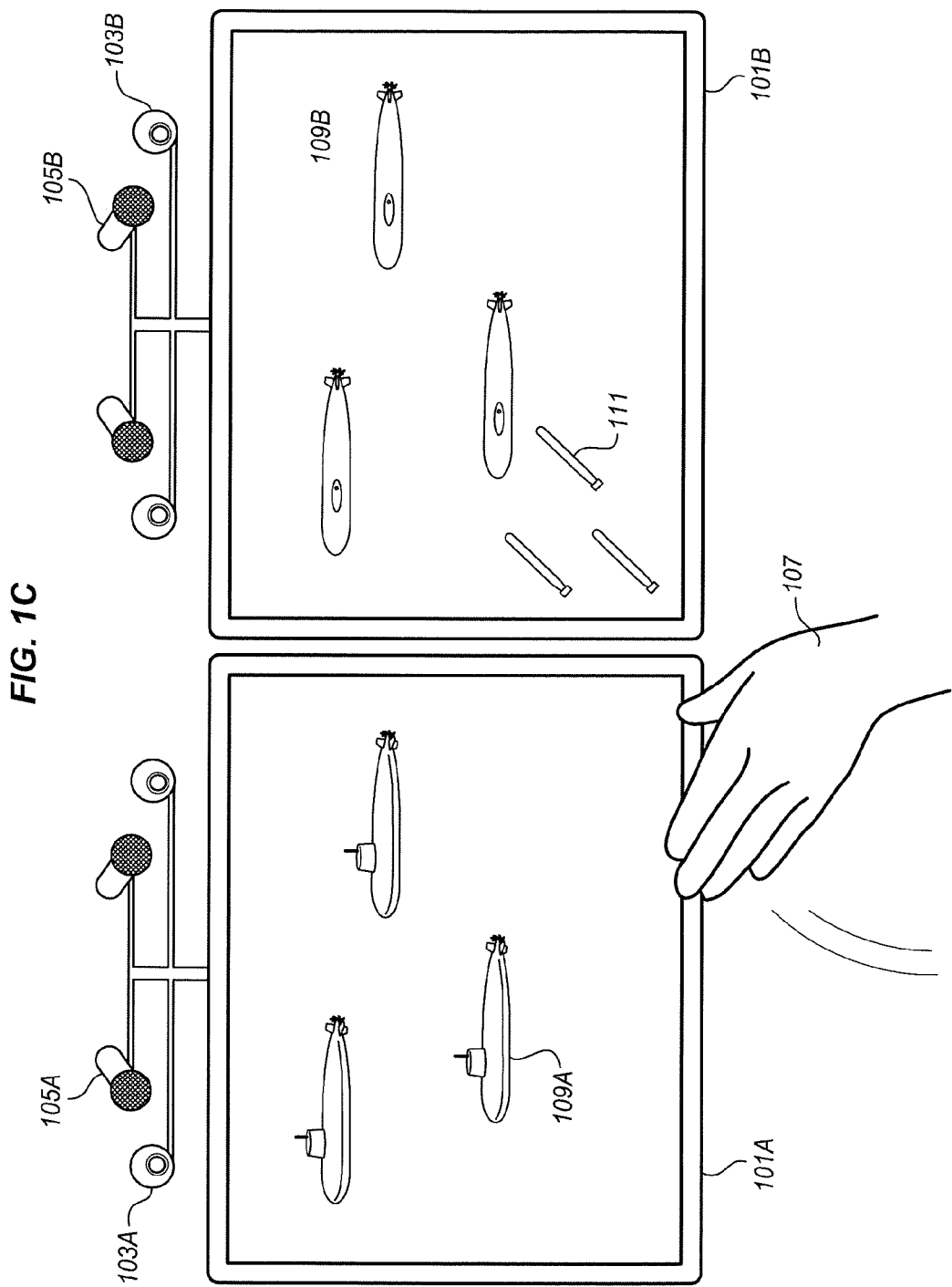

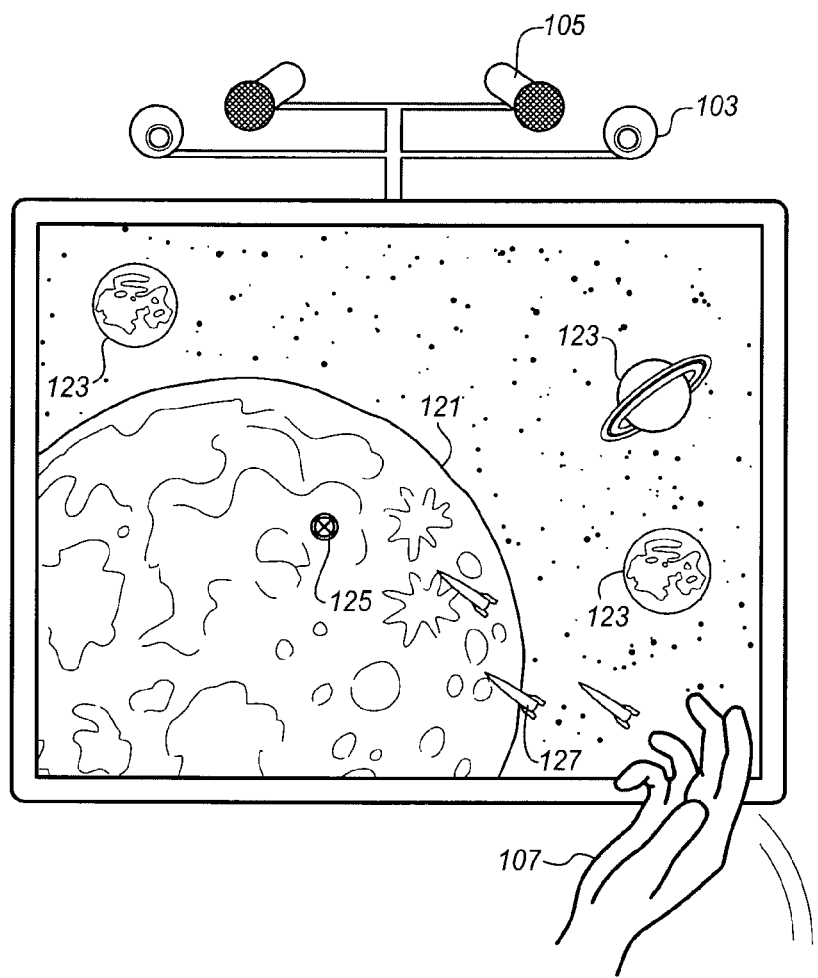

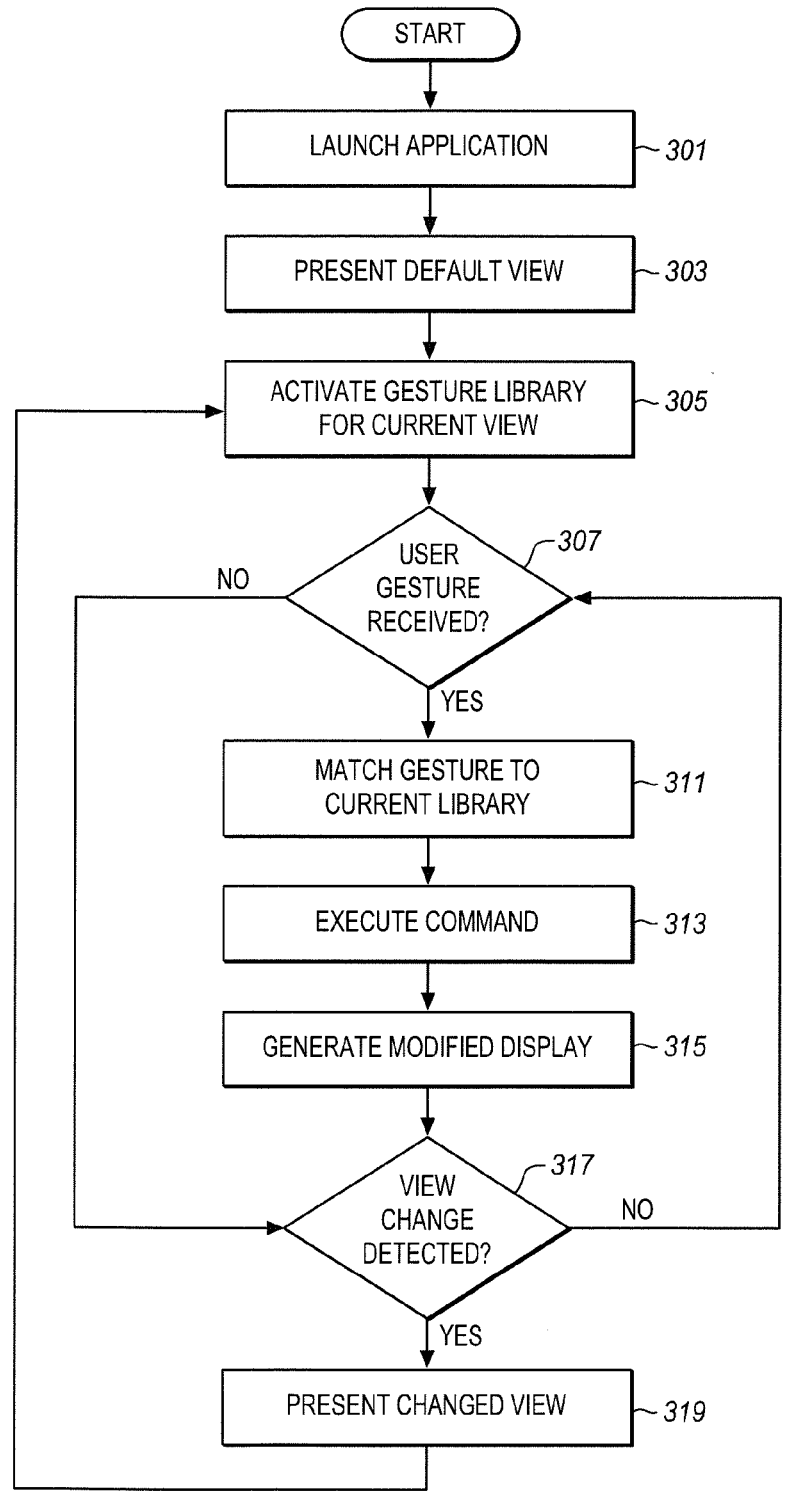

GESTURE INPUT WITH MULTIPLE VIEWS, DISPLAYS AND PHYSICS

CROSS-REFERENCE TO RELATED APPLICATION

This patent application is a U.S. National Phase Application under 35 U.S.C. §371 of International Application No. PCT/US2011/062140, filed Nov. 23, 2011, entitled "GESTURE INPUT WITH MULTIPLE VIEWS, DISPLAYS AND PHYSICS".

FIELD

The present description pertains to user input methodology and display in a computer system and, in particular, to representing user gestures in multiple display or three-dimensional display system.

BACKGROUND

Computer system inputs have developed to include air gestures and touch screen gestures as inputs. Air gestures can involve users moving their body and having a corresponding action happen on a display or having a corresponding command be executed by the computing system. One form of current air gesture technology uses movable sensors either as a controller or as the game console. The sensors are held in the hand, attached to the body, or manipulated by hands, feet, or other parts of the body (such as in the Wii remote controller by Nintendo Company, PlayStation Move by Sony Corporation, and various smartphones, and handheld gaming devices). Another form of air gesture technology uses 3D camera and microphone technology (such as in the Microsoft Kinect by Microsoft Corporation and PlayStation Eye by Sony Corporation) to approximate body motion as a modal input source.

Television, computer, and portable device displays are typical feedback mechanisms for viewing the effects of air-gesture modal input on a graphical environment. Cameras gather video input for gesture detection, and the video input is interpreted with software that runs on a gaming console or a personal computer. A camera array allows the cameras to sense depth. This provides the ability to recognize the position or distance of a person's body is in relation to the camera. The camera array allows for additional air gestures that move towards and away from the camera.

As another form of gestures, the screens of gaming consoles and computers, such as desktop, notebooks, tablets and smartphones, incorporate touch-screen technology which responds to touch input. Touch and sweep gestures on a display screen are used as a user input to execute commands to move objects from one screen (e.g. a handheld console screen) to another screen (e.g. a TV screen). Such features are implemented, for example, when using the PlayStation Portable game console together with a Play Station 3 console both marketed by the Sony Corporation. Touch and sweep gestures are also offered on trackpads of notebook computers and as surfaces on a peripheral mouse or external track pad.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 1C is a diagram of two displays simultaneously showing the first and the second views of the application and a user gesture applied to one of the views according to an embodiment of the invention.

FIG. 2A is a diagram of a display showing a third view of the application and a user gesture applied to that view according to an embodiment of the invention.

FIG. 3 is a process flow diagram of interpreting a gesture based on a selected view of an application according to an embodiment of the invention.

DETAILED DESCRIPTION

While gestures, whether air gestures or touch gestures find increasing application in computing environments, they lack a common feature of pointing devices. They do not necessarily indicate where the gesture is directed. For multiple windows, screens, or displays, it is not always clear where a gesture is directed. In examples described below, a computing system interprets a user gesture in different ways depending on the current view that is presented by an application or a computing system. The computing system determines a device, window, or screen a user is facing or looking at to determine the objects at which a gesture is directed. Multiple displays can be used to show different views of the same application or a game simultaneously, allowing users to coordinate gesture inputs from different perspectives. A similar approach can be applied to voice commands.

While eye tracking can be used to pair a voice command with an object on a computer display, multiple devices may have displays that present different objects simultaneously. The displays may also present the same objects in a different way. The system can react to user air, touch, or voice gestures differently depending on the current view of the application being displayed on a screen and depending on which screen a user is looking at. Air and voice gestures can then be directed at the appropriate view.

In addition, air, touch, and voice gestures can be used to create interaction between virtual objects that are not displayed and elements on the screen that cause physics effects on the virtual objects. In such a case, virtual objects can interact in a three-dimensional space in front of and behind a displayed screen plane. The displayed objects can be displayed on any one of several different screens.

The three-dimensional space can be characterized by targets, obstructions, and fields in, for example, a computer gaming environment in which, due to the physics characteristics of those objects, they interact with user gestures that are applied to virtual objects. Three-dimensional physics effects can be represented in this three-dimensional space. In this three-dimensional space, games and other applications can combine forces from targets, obstructions, and fields with forces from air gestures to provide a more complex, interactive, or realistic interaction with a user.

Figure 1A:
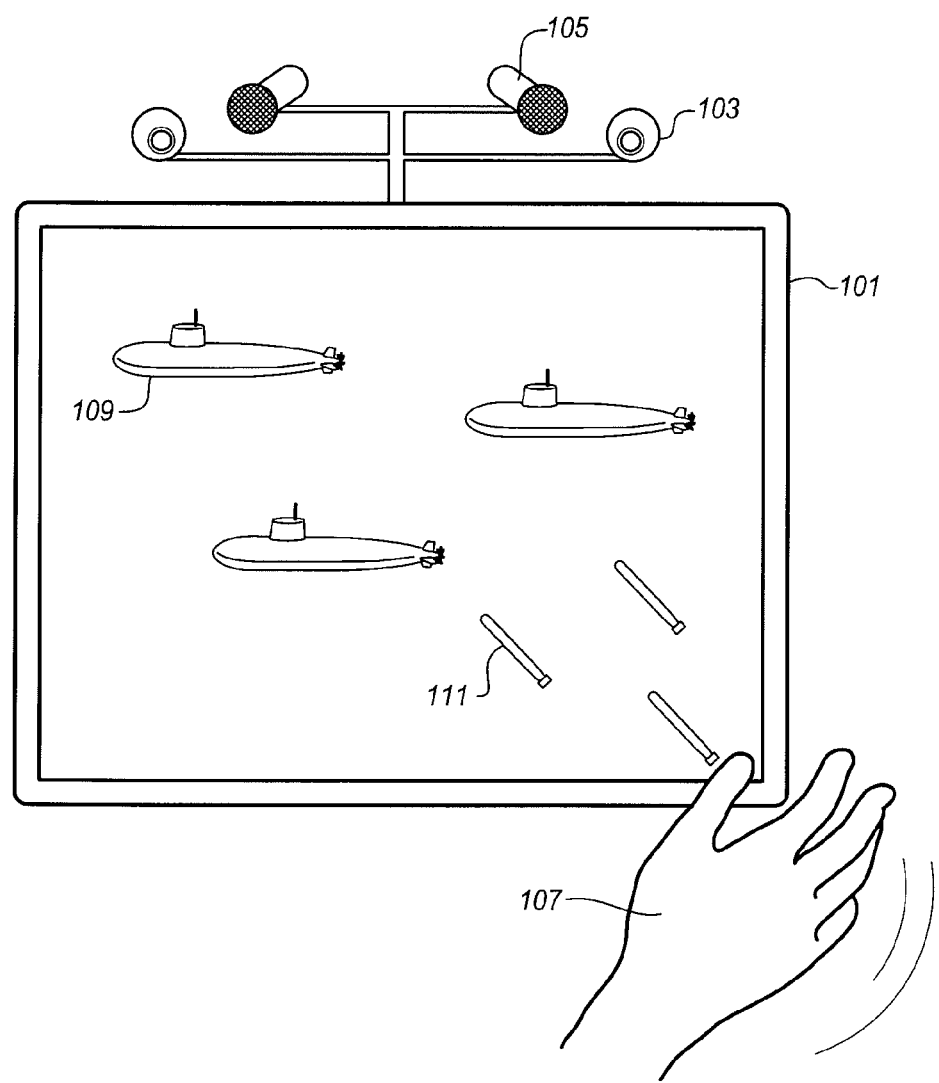
FIG. 1A is diagram of a display showing a first view of an application and a user gesture applied to that view according to an embodiment of the invention.

FIG. 1A is a diagram of an air gesture system having a display 101 coupled to an array of cameras 103 and an array of microphones 105. In the illustrated example, there are two cameras and two microphones, however, a larger or smaller number of cameras or microphones may be used for more or less accurate sensing of position and direction. The display may be a direct view or projection display on any type of display technology. As shown the camera microphone arrays are position over and attached to the display. However, any other position may be used. The camera and microphone may be positioned apart from each other and apart from the display. The arrays can be calibrated for or configured with knowledge of the position of the display in order to compensate for offset positions. The display may be a part of a portable computer, a gaming console, a handheld smartphone, personal digital assistant, or media player. Alternatively, the display may be a large flat panel television display or computer monitor In the example shown, the display shows three submarines 109 from a side view progressing through an undersea environment. A user shown as a hand 107 performs air gestures to direct torpedoes 111 at the displayed submarines. The user air gestures are detected by the cameras to execute a command to fire torpedoes. The system uses a gesture library for the undersea environment that contains possible gestures. When the hand performs a gesture, the system compares the observed gesture to the gesture library, finds the closest gesture, then looks up the associated command, such as fire torpedoes.

Figure 1B:
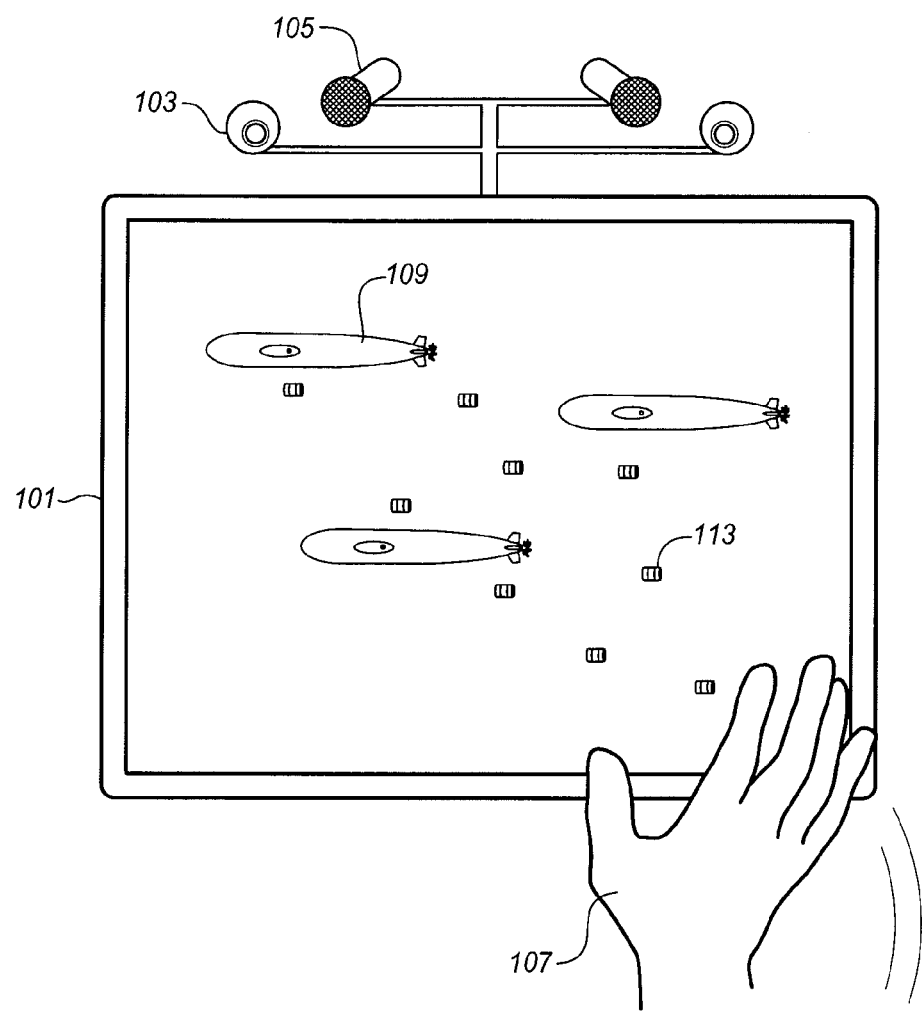
FIG. 1B is a diagram of a display showing a second view of the application and a user gesture applied to that view according to an embodiment of the invention.

FIG. 1B shows the same display 101 with the same camera and microphone arrays and the same submarines 109. However, in FIG. 1B the submarines are viewed from the top for example from the surface of the water or from a shallow depth downwards towards the submarines. The user 107 is performing the same air gesture which instead results in the release of depth charges 113 down toward the submarines. As can be seen, depending on whether the view of the submarines is from the side as in FIG. 1A or from the top as in FIG. 1B, the same finger pinch-release gesture as illustrated can result in different actions. In the example of FIG. 1A, the user gesturing from the side can make a throw gesture with a pinch and release to cause a torpedo to go towards the targets. In FIG. 1B the same pinch release can cause depth charges to be dropped toward the targets on the screen. While the gestures are the same, the system can determine the current view whether from the side or the top to determine whether the gesture is interpreted as a release of torpedoes or as a release of depth charges. As a result, a user can use an intuitive gesture which is simple to perform to cause different commands to be executed by the system.

FIG. 1C shows the same two displays side-by-side. In the illustrated example, both displays have a camera and microphone array, however, a single camera and microphone array may be used. These arrays may be connected to either display or located in a different position. In this example, each display 101a and 101b show the same three submarines, one shows the submarines 109a from the side while the other shows the submarines 109b from the top. The user can either throw torpedoes or drop depth charges 113 on the same submarines depending upon which screen is being used, or is current or active, at the time. As shown, the environment presents two displays that present the same three submarines simultaneously. The gesture, such as a pinch-release gesture, does not indicate which display the user intends, so that the system does not know whether to produce the torpedo command or the depth charge command. In this example, the camera array on one or both of the screens can determine which screen the user intends. For example, by tracking the users face, eye focus, or voice direction, the system can determine which screen the user is focusing attention on and then activate the corresponding command for that screen.

The same approach can also be used with touch screen and touch surface gestures, as well as with voice commands, rather than free hand air gestures The user might have a touch screen or touch surface and perform gestures on those surfaces. Again, in order to determine which view the gesture is to be applied against, the system can determine where the user's focus is. If the user is focusing on the side view, then a gesture on the touch surface can result in torpedoes being launched. Whereas if the user is focusing on the top view, the gesture can result in depth charges being launched. The two views of FIG. 1A and FIG. 1B can represent two different views of a single application. In FIG. 1C, the application generates both views simultaneously, whereas in FIGS. 1A and 1B only one view can be seen at a time. In either example, the system can determine the current view being used by the user and the current display.

If there is only one display, then a single view is used, however, the single display may present different windows on the one display. For example, the display of FIG. 1A may be presented in one window of a display whereas the display of FIG. 1B may be presented in another window of the display. In such an example, the camera array of 103 can determine which of the two windows the user has focused on and then execute the appropriate command for the user's gesture.

FIG. 2A shows a different screen display In FIG. 2A, the same display 101 with the same camera 103 and microphone 105 array presents a different view. In this example, the user 107 is using air gestures to throw a virtual spaceship at the screen. The spaceship appears on the screen after it is has traveled some distance from the user's air gesture and its behavior is governed by the user's gesture such as a throw and by the objects on the screen. In the illustrated example there is a large planet 121 surrounded by several moons 123. The user has been presented with a target 125 on the planet which is to be approached by the flying spaceships 127.

In the example of FIG. 2A, each of the planets and moons have a size relative to each other which determines its gravitational force as the spaceships are thrown toward the target 125. The moons and the planet modify the velocity and direction of the spaceships' travel due to their gravitational fields. As result, the user may intend to throw these space ships directly at the target but they may be pulled off course by a nearby moon or they may fall into orbit around the planet or a moon and not actually reach the target directly.

In the example of FIG. 2A, the screen display may present a part of a three dimensional space that has been generated by the system. In this three dimensional space, objects appear in the foreground and in the background on the screen. These can be rendered on a three dimensional display using shutter glasses or lenticular pixels that cause the perception of objects being closer and farther from the user. The objects can also be rendered on a two dimensional display using perspective. In both examples, the screen surface represents a particular plane in a z-axis running toward or away from the user. The screen lies at one point on this z-axis and objects cast by the user begin at some distance from the plane of the screen.

When a user throws an object towards the screen, it is first a virtual object which the user cannot see. As it reaches the plane of the screen in the three dimensional space, it appears as a displayed object on the screen. After it reaches the plane of the screen it continues to a background that may be represented as far away points on the screen.

The interaction with objects on the screen may be enhanced further by including additional objects in the three dimensional space that are not shown on the screen. As a result, a user may throw a spaceship 127 toward the target 125 and find that its course and velocity have already been altered before it reaches the plane of the screen. These objects and the alteration in course will not be shown on the screen. However, the effects will be shown when the spaceship arrives at the plane of the screen.

Figure 2B:
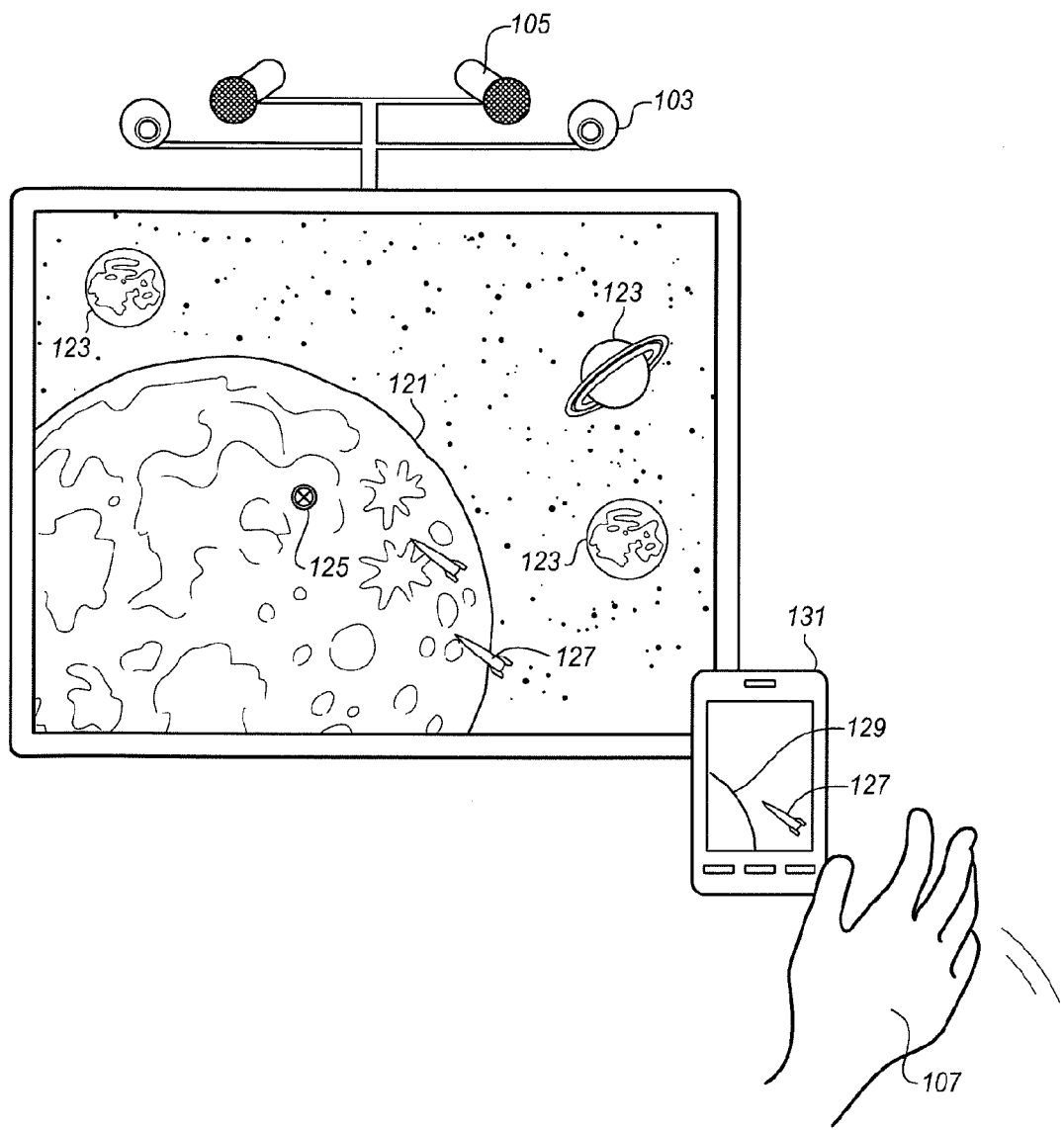
FIG. 2B is a diagram of a two displays simultaneously showing different parts of the third view of the application and a user gesture applied to that view according to an embodiment of the invention.

FIG. 2B is a diagram of the same display and screen of FIG. 2A. However, an additional screen 131 has been added. This screen is shown as a portable device such as a smart phone or portable gaming system however it could be any other type of display including a display of the same type as the main display 101. The small display 131 is placed, in this example, in front of the main large display 101. The system can determine the position of the small screen 131 and present a portion of the three dimensional space that lies in the plane of the small screen. So for example in FIG. 2B, the user 107 has thrown a space ship 127 toward the planet 121 and in particular at the target 125 on that planet. After the spaceship has been thrown it first appears on the small screen 131.

As shown an object 129 that is not visible on the main screen 101 is visible on the small screen. This object 129 is in the form of another moon which can exert a gravitational or other force on the spaceship 127. As the spaceship continues through the three dimensional space, it will leave the small display 131 and after some time show up on the large display 101. The addition of the small screen adds a new dimension to this particular type of game play. The camera array 103 or some other proximity sensing system can determine the position of the small screen in real time. The user can then move the small screen around to see objects that are not displayed on the main screen 101. As a result, upon throwing a space ship 127 in the example of FIG. 2A, if the course and velocity of the spaceship is significantly altered, the user can use a small screen 131 to find which objects have influenced its path and compensate accordingly. The small screen can be moved around in different planes on the z-axis to see what is in front of the large screen 101. A similar approach can be used to see what is beside or behind the large screen.

The approach discussed above with respect to FIG. 1C can also be used in the example of FIG. 2B. In the case of, for example, a smart phone the small screen 131 will also be equipped with one or more cameras and microphones facing the user. While these are typically provided for use on video conferences and telephone voice calls, the cameras and microphones can instead be used to determine the position of a user, the position of other displays, and to see and interpret gestures. Similarly the cameras on the small screen 131 and the large screen 101 can be used to determine where a user's attention is focused and interpret air gestures or other gestures according to the particular display used. So for example instead of showing a different portion of a three dimensional space, the small screen 131 may instead be used to show a different view as in the example of FIG. 1C.

FIG. 3 is an example process flow for using the display and user configuration shown in FIGS. 1 and 2. In FIG. 3, the process starts and a user launches an application which may be a game or any other application to which gestures and multiple displays may be used. At 303, the system presents a default view of the application. This default may be determined in a variety of different ways. At 305, the system activates a gesture library for the default view. In this case, current view is the default view and so this gesture library can be loaded by default. The gesture library can be formed in a variety of different way. In one example, the gesture library is in the form of a look up table in which particular camera sensor points are connected to different commands that the program can execute. In the examples discussed above, a similar gesture can be executed as a command to throw torpedoes, launch depth charges, or throw spaceships depending on the particular view presented to the user. A wide range of different gestures maybe be used in the library to perform different commands.

At 307, the system waits to determine if a gesture had been received. This gesture can be received through cameras, through a touch surface, through a touch screen, or a voice gesture can be received in a microphone. If a gesture is received, then the process proceeds to block 311, where the gesture is matched to the loaded current library. The system matches the gesture to one of the gestures in the library and then finds the corresponding command.

At 313 this command is executed and at 315 the display is modified to display the action on the screen of the executed command. After executing a command of the gesture, the system detects whether there has been a change in view at 317. A change of view corresponds to a different window on the display or a different display. If a change of view is detected, then the process proceeds to present the change in view and then returns to block 305 to change the gesture library to correspond to the change in the view. If no change in the view is detected, then the system proceeds to wait for a new user gesture at 307. If a user gesture is received then, as before at 311, the gesture is matched in the currently loaded library. If no gesture is received then the system proceeds to 317 to determine if a change in the view is detected. This cycle can repeat to receive additional user gestures and to view changes to provide user interaction throughout use of the system.

Figure 4:
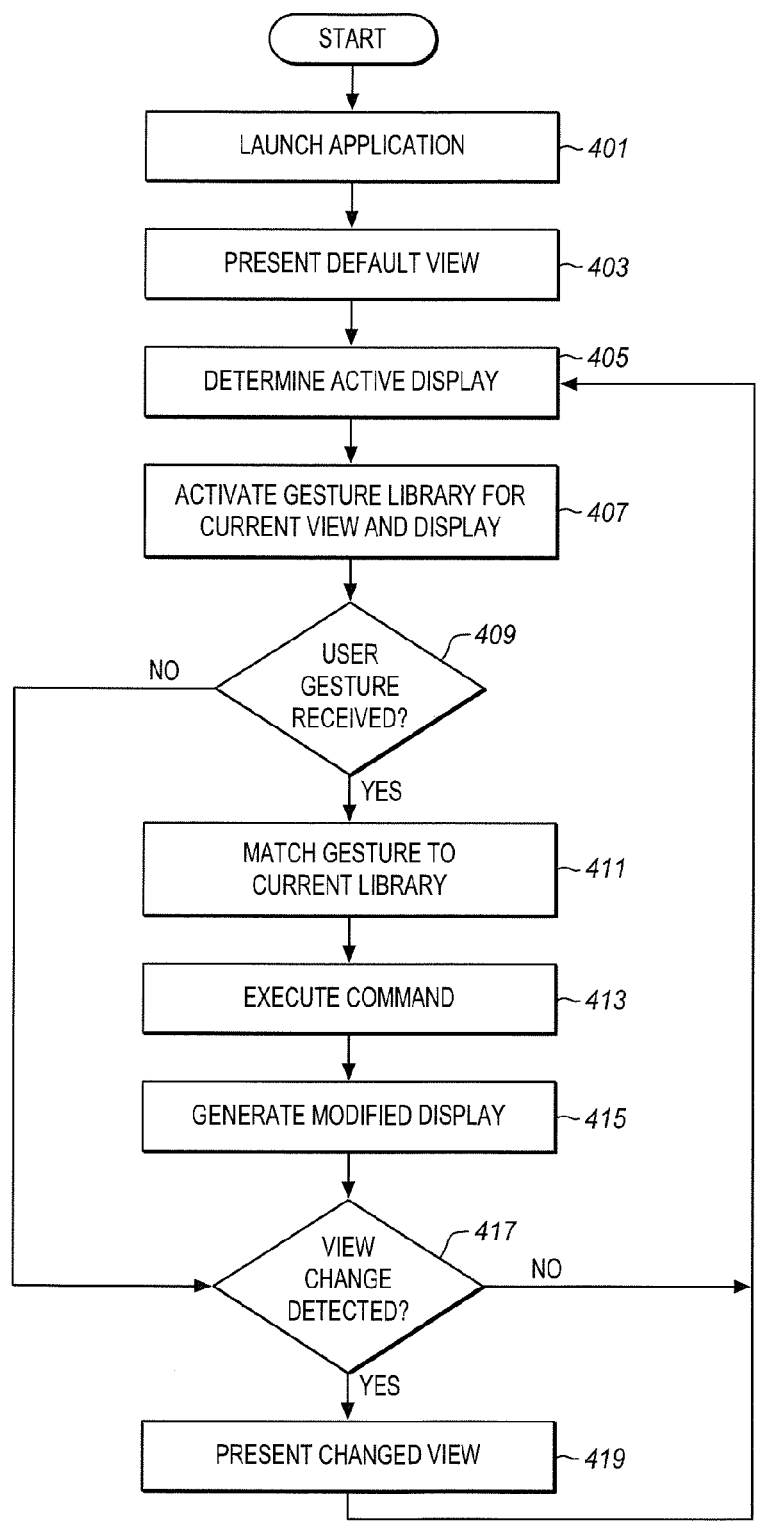
FIG. 4 is a process flow diagram of interpreting a gesture based on a selected view and a selected display of an application according to an embodiment of the invention.

FIG. 4 shows an alternative process flow diagram for using multiple views and multiple displays in an application. At 401, the system is started and an application is launched. At 403, a default view for the application is presented. At 405, the active display is determined. This can be determined by determining a user's focus or attention. In one example, the camera array determines which direction a user is looking. For example, a camera can detect a face and determine an angle of the face to determine if the user is looking directly at one display or the other. This can be done, as in the example of FIG. 1C, using a separate camera array for each display. Alternatively, a single camera array can determine if a user is looking at one display or the other. In one example, the camera array determines the position of a user's pupils to see in which direction the user is looking. In another example, the camera array determines which way a face is pointed. Other user actions can be used to determine which display is the active display. For example, the user can point to different displays, make swiping motions in the air or a variety of other gestures to indicate which display should be the active display.

At 407, the gesture library for the current view and the current display is activated. The system loads the input recognition library which is appropriate for that display and that view. At 409, the system determines whether a user gesture has been received if a user gesture has been received, then at 411 this gesture is matched to the current library. The corresponding command is executed at 413 and a modified display is generated at 415. If no user gesture has been received, then the process skips forward to determine if a change of view is detected at 417. If a change of view has not been detected then the system returns to determine the active display at 405. If a change of view has been detected, then the changed view is presented at 419 and the process returns to determine the act of display.

The process flow of FIG. 4 allows a system to match the gesture library to a particular view as well as to a particular display. As a result, an application can present multiple views and multiple displays and change the effect of user gestures depending on the current view and current display. In alternative embodiments, the user may be only presented with different views or different displays but not both depending on the implementation.

Figure 5:
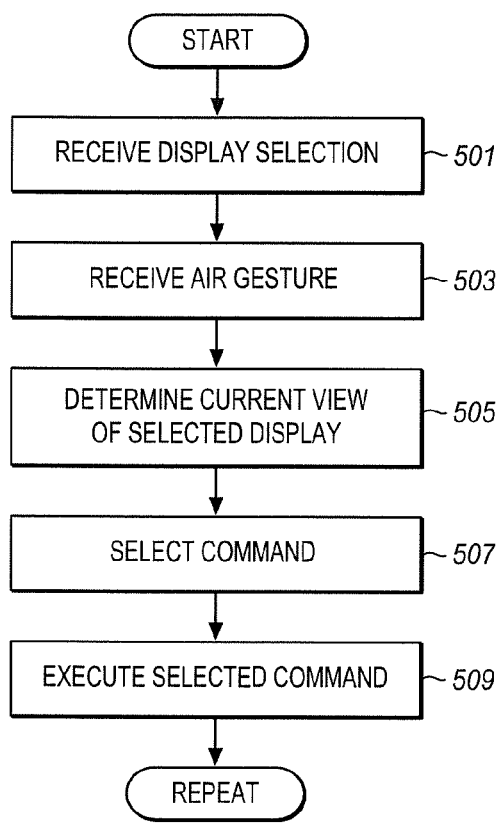
FIG. 5 is a process flow diagram of interpreting a gesture based on a selected view and a selected display of an application according to another embodiment of the invention.

FIG. 5 shows a simplified process flow for using air gestures with different displays. At 501, the process is started and a display selection is received. The display selection can be done by determining where a user is looking with face detection or eye tracking or determining in which direction a user is speaking through the microphone array or a user can indicate a particular display through voice or air commands. At 503, an air gesture is received. At 505, the current view of a selected display is determined. At 507, a command is selected based on the current view for the selected display and, at 509, the selected command is executed. This process is repeated to provide repeated user interaction with the displays and with the application in the provided views.

Figure 6:
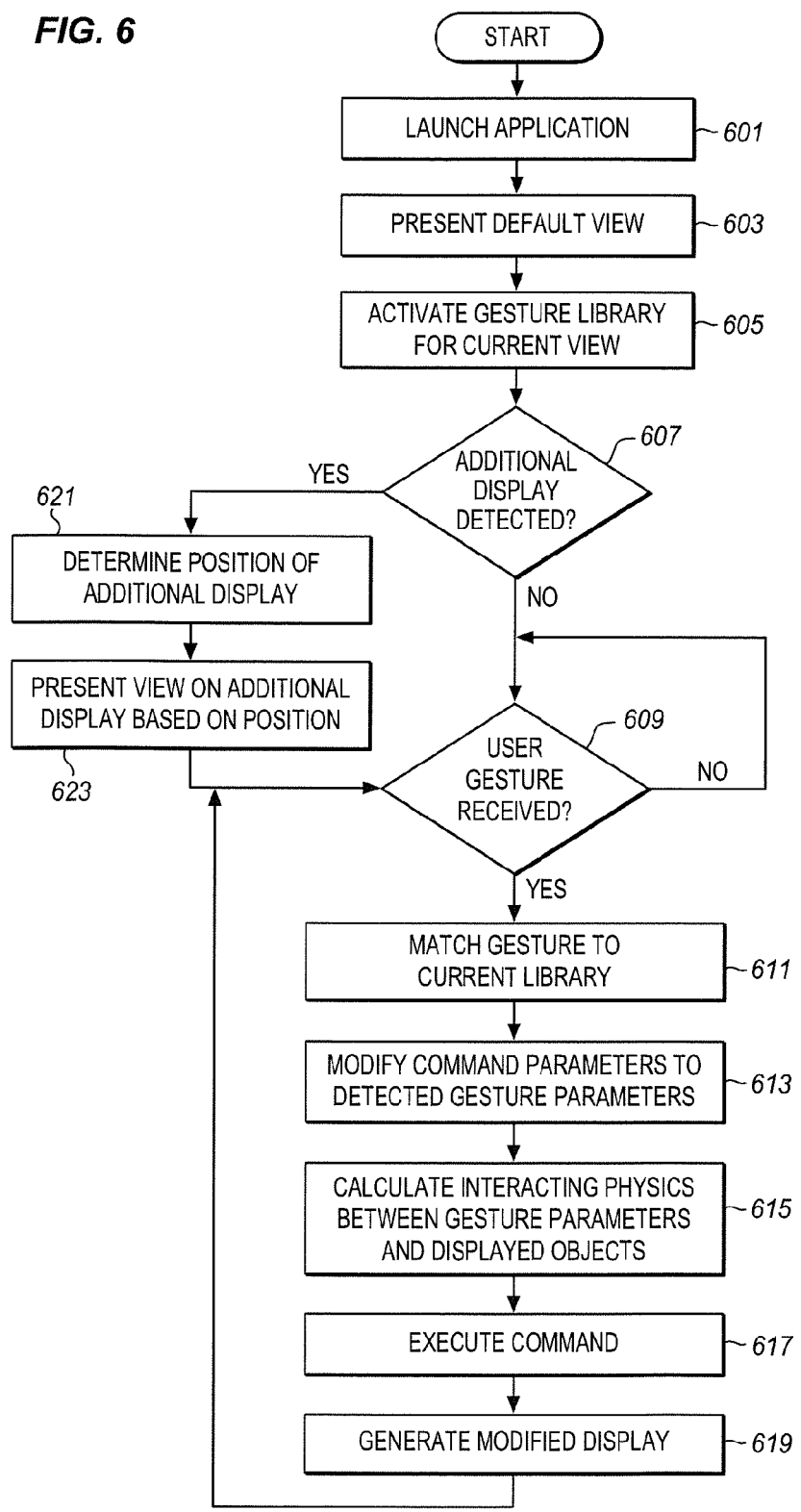
FIG. 6 is a process flow diagram of interpreting a gesture on multiple displays using interacting physics of an application according to an embodiment of the invention.

Referring to FIG. 6, applications can incorporate a variety of interacting physics with a gesture library to present user interactions with different views. At 601, the application is started and an application is launched. At 603, a default view is presented. At 605, a gesture library is activated for the current view. The relevant gesture templates are loaded into memory together with the corresponding commands to be executed upon detecting the gesture.

At 607 the system determines whether any additional displays can be detected. If so then the position of this additional display is determined at 621. This is calculated using cameras RF (Radio Frequency) or IR (Infrared) sensors. At 623, a view is presented on this additional display based on its position. The process returns to determine whether user gestures are received at 609. If no user gesture is received, then, when the process continues to wait in the background, additional processes can continue to detect additional displays and to detect the current view. Other processes can also run simultaneously to detect which display is active as described in the examples above.

When a gesture is received at 609, then, at 611, the gesture is matched to the current library. The user can use gestures to select projectiles, launch projectiles, change configuration settings and more. When a gesture has been matched against the current loaded gesture library then a command is selected and, at 613, the command is modified in accordance with the parameters of the gesture. So, for example, the system can measure the velocity of the hand, the angle of movement of the hand, and the point of release by the hand, or similar parameters using other kinds of air gestures or touch surface gestures. These parameters are then added to the command from the gesture library and, at 615, using the interacting physics, the resulting action is determined.

A virtual object launched by an air gesture is given a velocity and a direction by the user's gesture. It can also possess a virtual mass, air resistance, acceleration and other possible physics parameters. The system then calculates interacting physics between the virtual object generated by the gesture parameters and displayed objects in the three dimensional space. Additional interactions can be calculated for objects that are not displayed but which are still present in the three dimensional space. As an example, the moon 129 of FIG. 2B is an object in the three dimensional space that is not displayed on the main screen 101. A user without the additional screen 131 would not see that object as a displayed object. However, that object can exert an interaction upon the virtual object generated by the air gesture. At 617, these commands are executed and, at 619, the display is modified to show the virtual object as it arrives on the display. The display is also modified to show the results of its interactions with other objects in the three dimensional space including the displayed objects and perhaps additional objects in the three dimensional space that are not displayed. Having executed the command, the system returns to receive additional user gestures at 609.

Figure 7:
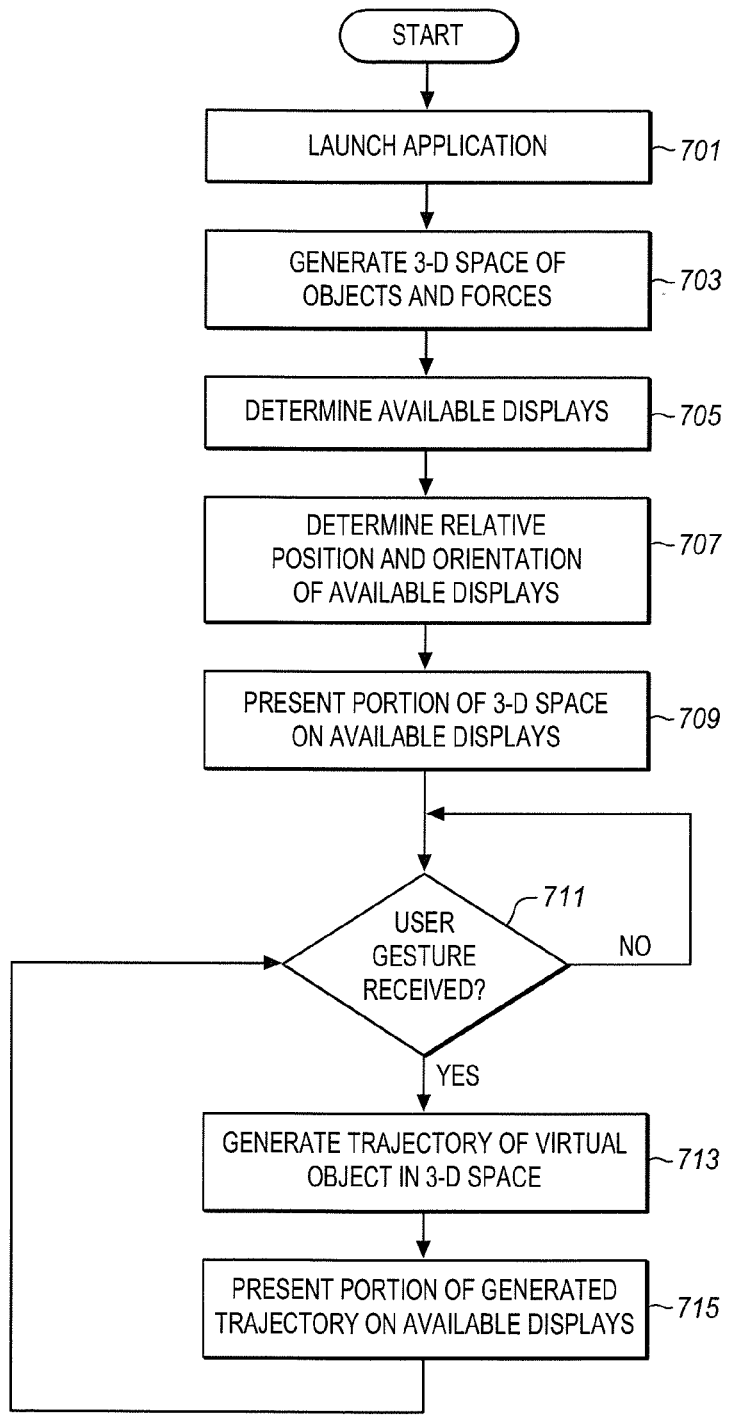
FIG. 7 is a process flow diagram of interpreting a gesture on multiple displays using interacting physics of an application according to another embodiment of the invention.

FIG. 7 shows a simplified process flow for using a three dimensional space of objects and forces with user gestures. At 701, the process starts and the application is launched. At 703, a three dimensional space is generated that includes one or more objects and one or more forces. In the example of FIG. 2B, these objects are planets and moons with gravitational forces. However a wide range of different kinds of objects can be generated and different kinds of forces can be used. At 705, the system determines the displays that are available for use by the system. At 707, the relative position and orientation of these available displays is determined and, at 709, a portion of the three dimensional space is presented on the available displays. The amount of the three dimensional space that is presented on the displays can be determined based on the size and position of the displays as well as whether the displays allow for the presentation of three dimensional views or two dimensional views. At 711, the system determines if a user gesture has been received. If not, it waits for the user gesture. If a user gesture has been received, then, at 713, a trajectory of a resulting virtual object is generated in the three dimensional space. At 715, a portion of the generated trajectory is shown on the available displays. As mentioned above, the launched virtual object as a result of the gesture may traverse part of the three dimensional space without being visible on any display and may traverse another part of the three dimensional space visible on the displays. The system can determine the position of the virtual object as it traverses the three dimensional space and compare that to the portion of the three dimensional space that is presented on the displays that are available. In this way, the object can enter and leave displays while still traversing a consistent trajectory through the three dimensional space. After presenting the generated trajectory the process returns to receive additional user gestures at 711.

There are a wide variety of different effects and interaction that may be provided, depending on the particular implementation. The Table shows some of these, however, embodiments of the invention are not so limited.

to either depict a target landing area for the virtual object if the virtual object could be moved to the display of the device with which the Adjacent Screen Perspective Module is associated. Thus, for example, if the virtual object is being moved from a main screen to an auxiliary screen, the Adjacent Screen Perspective Module 2 could send data to

TABLE

| Physics | Virtual Projectiles (e.g., spaceships) | Obstructions and Fields | Target |
| --- | --- | --- | --- |
| Gravity | The projectile could cause gravitational effects on smaller objects such as other spacecraft. | Larger and more dense (darker colored) obstructions will have more gravity. | Some targets could have gravitational forces. |
| Acceleration | The projectile could accelerate and decelerate depending on other effects | Obstructions will cause projectiles to accelerate toward them. | Targets could try to elude projectiles. |
| Velocity | Generally higher velocity will minimize gravitational effects, though not in special cases. | Obstructions will have the potential to move. | Targets can be moving. |
| Inertia | The virtual mass of the projectile would interact with other physics elements. | Depending on mass, obstructions could be effected by projectiles or other obstructions. | All objects and fields have the potential for repelling objects. |
| Static resistance fields | Resistance fields slow progress of projectile. Aero dynamics would make a difference. | Resistance fields will generally slow projectiles but could speed them. | A target could be within a static or initial resistance field. |
| Elastic resistance | The projectile could be launch with a virtual elastic band, which would supply additional physics. | Some obstructions could have elastic properties to bounce projectiles. | Projectiles could bounce off multiple targets. |
| Inertial resistance fields | Some resistance fields could offer more resistance to faster moving objects. | Potential for more resistance to faster moving objects. | A target could be within a static or initial resistance field. |
| Repel forces | All objects and fields have the potential for repelling objects. | All objects and fields have the potential for repelling objects. | All objects and fields have the potential for repelling objects. |

Figure 8:
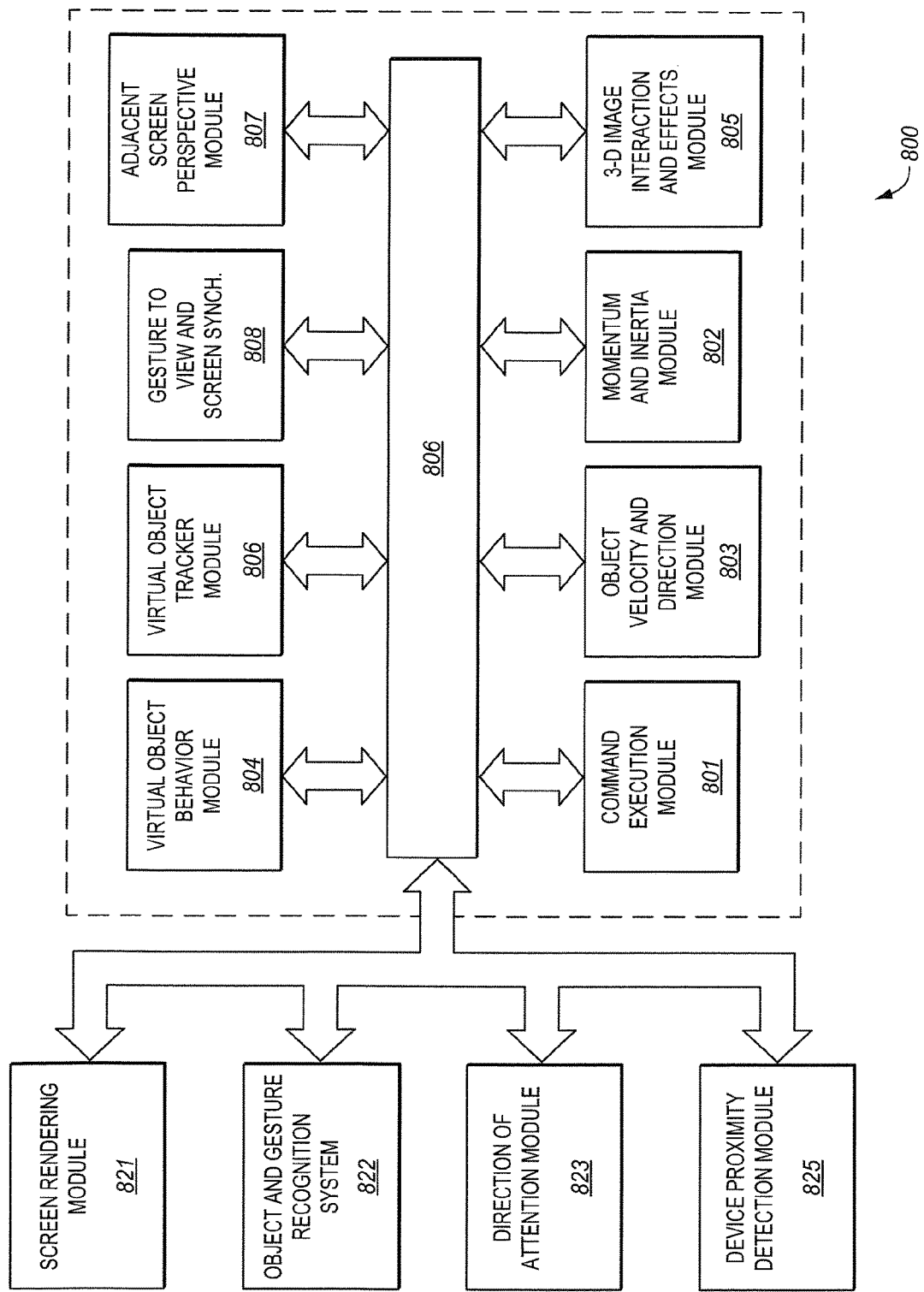
FIG. 8 is block diagram of a computer system suitable for implementing processes of the present disclosure according to an embodiment of the invention.

FIG. 8 is a block diagram of a computing environment capable of supporting the operations discussed above. The modules and systems can be implemented in a variety of different hardware architectures and form factors including that shown in FIG. 9.

The Command Execution Module 801 includes a central processing unit to cache and execute commands and to distribute tasks among the other modules and systems shown. It may include an instruction stack, a cache memory to store intermediate and final results, and mass memory to store applications and operating systems. The Command Execution Module may also serve as a central coordination and task allocation unit for the system.

The Screen Rendering Module 821 draws objects on the one or more multiple screens for the user to see. It can be adapted to receive the data from the Virtual Object Behavior Module 804, described below, and to render the virtual object and any other objects and forces on the appropriate screen or screens. Thus, the data from the Virtual Object Behavior Module would determine the position and dynamics of the virtual object and associated gestures, forces and objects, for example, and the Screen Rendering Module would depict the virtual object and associated objects and environment on a screen, accordingly. The Screen Rendering Module could further be adapted to receive data from the Adjacent Screen Perspective Module 807, described below, the Screen Rendering Module to suggest, for example in shadow form, one or more target landing areas for the virtual object on that track to a user's hand movements or eye movements.

The Object and Gesture Recognition System 822 may be adapted to recognize and track hand and harm gestures of a user. Such a module may be used to recognize hands, fingers, finger gestures, hand movements and a location of hands relative to displays. For example, the Object and Gesture Recognition Module could for example determine that a user made a body part gesture to drop or throw a virtual object onto one or the other of the multiple screens, or that the user made a body part gesture to move the virtual object to a bezel of one or the other of the multiple screens. The Object and Gesture Recognition System may be coupled to a camera or camera array, a microphone or microphone array, a touch screen or touch surface, or a pointing device, or some combination of these items, to detect gestures and commands from the user.

The touch screen or touch surface of the Object and Gesture Recognition System may include a touch screen sensor. Data from the sensor may be fed to hardware, software, firmware or a combination of the same to map the touch gesture of a user's hand on the screen or surface to a corresponding dynamic behavior of a virtual object. The sensor date may be used to momentum and inertia factors to allow a variety of momentum behavior for a virtual object based on input from the user's hand, such as a swipe rate of a user's finger relative to the screen. Pinching gestures may be interpreted as a command to lift a virtual object from the display screen, or to begin generating a virtual binding associated with the virtual object or to zoom in or out on a display. Similar commands may be generated by the Object and Gesture Recognition System using one or more cameras without benefit of a touch surface.

The Direction of Attention Module 823 may be equipped with cameras or other sensors to track the position or orientation of a user's face or hands. When a gesture or voice command is issued, the system can determine the appropriate screen for the gesture. In one example, a camera is mounted near each display to detect whether the user is facing that display. If so, then the direction of attention module information is provided to the Object and Gesture Recognition Module 822 to ensure that the gestures or commands are associated with the appropriate library for the active display. Similarly, if the user is looking away from all of the screens, then commands can be ignored.

The Device Proximity Detection Module 825 can use proximity sensors, compasses, GPS (global positioning system) receivers, personal area network radios, and other types of sensors, together with triangulation and other techniques to determine the proximity of other devices. Once a nearby device is detected, it can be registered to the system and its type can be determined as an input device or a display device or both. For an input device, received data may then be applied to the Object Gesture and Recognition System 822. For a display device, it may be considered by the Adjacent Screen Perspective Module 807.

The Virtual Object Behavior Module 804 is adapted to receive input from the Object Velocity and Direction Module, and to apply such input to a virtual object being shown in the display. Thus, for example, the Object and Gesture Recognition System would interpret a user gesture and by mapping the captured movements of a user's hand to recognized movements, the Virtual Object Tracker Module would associate the virtual object's position and movements to the movements as recognized by Object and Gesture Recognition System, the Object and Velocity and Direction Module would capture the dynamics of the virtual object's movements, and the Virtual Object Behavior Module would receive the input from the Object and Velocity and Direction Module to generate data that would direct the movements of the virtual object to correspond to the input from the Object and Velocity and Direction Module.

The Virtual Object Tracker Module 806 on the other hand may be adapted to track where a virtual object should be located in three dimensional space in a vicinity of an display, and which body part of the user is holding the virtual object, based on input from the Object and Gesture Recognition Module. The Virtual Object Tracker Module 806 may for example track a virtual object as it moves across and between screens and track which body part of the user is holding that virtual object. Tracking the body part that is holding the virtual object allows a continuous awareness of the body part's air movements, and thus an eventual awareness as to whether the virtual object has been released onto one or more screens.

The Gesture to View and Screen Synchronization Module 808, receives the selection of the view and screen or both from the Direction of Attention Module 823 and, in some cases, voice commands to determine which view is the active view and which screen is the active screen. It then causes the relevant gesture library to be loaded for the Object and Gesture Recognition System 822. Various views of an application on one or more screens can be associated with alternative gesture libraries or a set of gesture templates for a given view. As an example in FIG. 1A a pinch-release gesture launches a torpedo, but in FIG. 1B, the same gesture launches a depth charge.

The Adjacent Screen Perspective Module 807, which may include or be coupled to the Device Proximity Detection Module 825, may be adapted to determine an angle and position of one display relative to another display. A projected display includes, for example, an image projected onto a wall or screen. The ability to detect a proximity of a nearby screen and a corresponding angle or orientation of a display projected therefrom may for example be accomplished with either an infrared emitter and receiver, or electromagnetic or photodetection sensing capability. For technologies that allow projected displays with touch input, the incoming video can be analyzed to determine the position of a projected display and to correct for the distortion caused by displaying at an angle. An accelerometer, magnetometer, compass, or camera can be used to determine the angle at which a device is being held while infrared emitters and cameras could allow the orientation of the screen device to be determined in relation to the sensors on an adjacent device. The Adjacent Screen Perspective Module 807 may, in this way, determine coordinates of an adjacent screen relative to its own screen coordinates. Thus, the Adjacent Screen Perspective Module may determine which devices are in proximity to each other, and further potential targets for moving one or more virtual object's across screens. The Adjacent Screen Perspective Module may further allow the position of the screens to be correlated to a model of three-dimensional space representing all of the existing objects and virtual objects.

The Object and Velocity and Direction Module 803 may be adapted to estimate the dynamics of a virtual object being moved, such as its trajectory, velocity (whether linear or angular), momentum (whether linear or angular), etc. by receiving input from the Virtual Object Tracker Module. The Object and Velocity and Direction Module may further be adapted to estimate dynamics of a any physics forces, by for example estimating the acceleration, deflection, degree of stretching of a virtual binding, etc. and the dynamic behavior of a virtual object once released by a user's body part. The Object and Velocity and Direction Module may also use image motion, size and angle changes to estimate the velocity of objects, such as the velocity of hands and fingers The Momentum and Inertia Module 802 can use image motion, image size, and angle changes of objects in the image plane or in a three-dimensional space to estimate the velocity and direction of objects in the space or on a display. The Momentum and Inertia Module is coupled to the Object and Gesture Recognition System 822 to estimate the velocity of gestures performed by hands, fingers, and other body parts and then to apply those estimates to determine momentum and velocities to virtual objects that are to be affected by the gesture.

The 3-D Image Interaction and Effects Module 805 tracks user interaction with 3-D images that appear to extend out of one or more screens. The influence of objects in the z-axis (towards and away from the plane of the screen) can be calculated together with the relative influence of these objects upon each other. For example, an object thrown by a user gesture can be influenced by 3-D objects in the foreground before the virtual object arrives at the plane of the screen. These objects may change the direction or velocity of the projectile or destroy it entirely. The object can be rendered by the 3-D Image Interaction and Effects Module in the foreground on one or more of the displays.

Figure 9:
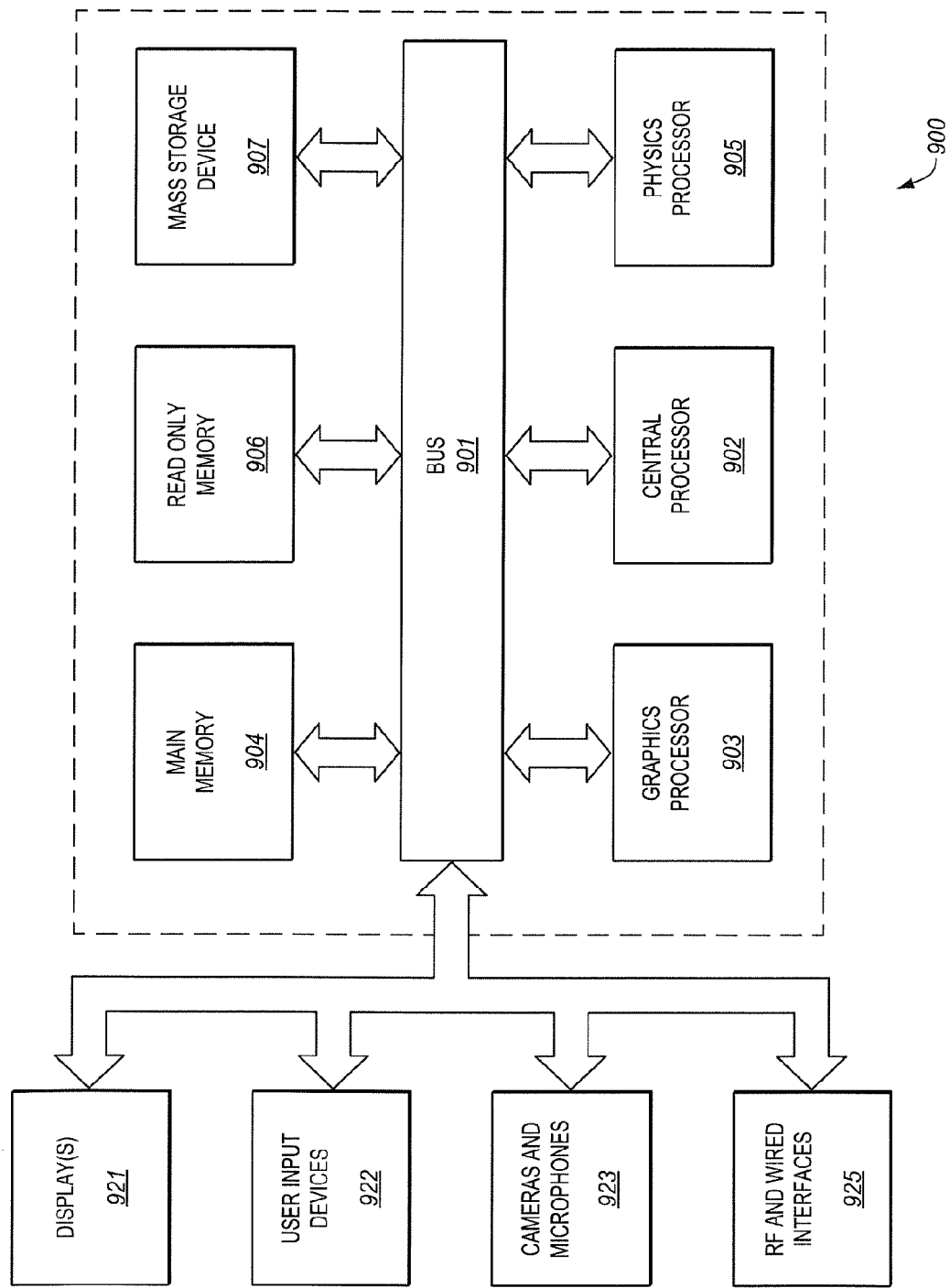
FIG. 9 is a block diagram of a an alternative view of the computer system of FIG. 8 suitable for implementing processes of the present disclosure according to an embodiment of the invention.

FIG. 9 is a block diagram of a computing system, such as a personal computer, gaming console, smartphone or portable gaming device. The computer system 900 includes a bus or other communication means 901 for communicating information, and a processing means such as a microprocessor 902 coupled with the bus 901 for processing information. The computer system may be augmented with a graphics processor 903 specifically for rendering graphics through parallel pipelines and a physics processor 905 for calculating physics interactions as described above. These processors may be incorporated into the central processor 902 or provided as one or more separate processors.

The computer system 900 further includes a main memory 904, such as a random access memory (RAM) or other dynamic data storage device, coupled to the bus 901 for storing information and instructions to be executed by the processor 902. The main memory also may be used for storing temporary variables or other intermediate information during execution of instructions by the processor. The computer system may also include a nonvolatile memory 906, such as a read only memory (ROM) or other static data storage device coupled to the bus for storing static information and instructions for the processor.

A mass memory 907 such as a magnetic disk, optical disc, or solid state array and its corresponding drive may also be coupled to the bus of the computer system for storing information and instructions. The computer system can also be coupled via the bus to a display device or monitor 921, such as a Liquid Crystal Display (LCD) or Organic Light Emitting Diode (OLED) array, for displaying information to a user. For example, graphical and textual indications of installation status, operations status and other information may be presented to the user on the display device, in addition to the various views and user interactions discussed above.

Typically, user input devices, such as a keyboard with alphanumeric, function and other keys, may be coupled to the bus for communicating information and command selections to the processor. Additional user input devices may include a cursor control input device such as a mouse, a trackball, a trackpad, or cursor direction keys can be coupled to the bus for communicating direction information and command selections to the processor and to control cursor movement on the display 921.

Camera and microphone arrays 923 are coupled to the bus to observe gestures, record audio and video and to receive visual and audio commands as mentioned above.

Communications interfaces 925 are also coupled to the bus 901. The communication interfaces may include a modem, a network interface card, or other well known interface devices, such as those used for coupling to Ethernet, token ring, or other types of physical wired or wireless attachments for purposes of providing a communication link to support a local or wide area network (LAN or WAN), for example. In this manner, the computer system may also be coupled to a number of peripheral devices, other clients, or control surfaces or consoles, or servers via a conventional network infrastructure, including an Intranet or the Internet, for example.

It is to be appreciated that a lesser or more equipped system than the example described above may be preferred for certain implementations. Therefore, the configuration of the exemplary systems 800 and 900 will vary from implementation to implementation depending upon numerous factors, such as price constraints, performance requirements, technological improvements, or other circumstances.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection). Accordingly, as used herein, a machine-readable medium may, but is not required to, comprise such a carrier wave.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A method comprising:
receiving an air gesture in a user interface system of a computing system, wherein the computing system comprises multiple displays;
determining a display selection for the gesture;
determining a current view on the selected display;
loading a gesture library for the selected display and the current view;
selecting a command for the gesture from the loaded gesture library corresponding to the selected display and the current view; and
executing the selected command.

2. The method of claim wherein determining a display selection comprises determining a user direction by observing a position of the user with a camera.

3. The method of claim 2, wherein observing a position comprises determining a direction in which a user's face is pointed.

4. The method of claim 2, wherein observing a position comprises determining a direction in which the user's eyes are pointed.

5. The method of claim 1, wherein determining a display selection comprises determining a user direction by observing a direction of the voice of the user with a microphone.

6. The method of claim 1, wherein the air gesture comprises at least one of a finger movement, a hand movement, an arm movement, a body movement, and a vocal command.

7. The method of claim 1, further comprising receiving a voice command, wherein determining a current view on a display comprises sensing a direction in which a user's face is pointing, and wherein selecting a command comprises selecting a command for the gesture and the voice command.

8. The method of claim 1, wherein the display renders images as three-dimensional images.

9. A non-transitory machine-readable medium having instructions stored thereon which, when executed by a computer, cause the computer to perform operations comprising:
receiving an air gesture in a user interface system of a computing system, wherein the computing system comprises multiple displays;
determining a display selection for the gesture;
determining a current view on the selected display;
loading a gesture library for the selected display and the current view;
selecting a command for the gesture from the loaded gesture library corresponding to the selected display and the current view; and
executing the selected command.

10. The medium of claim 9, wherein determining a display selection comprises determining a user direction by observing a position of the user with a camera.

11. The medium of claim 9, the operations further comprising receiving a voice command, wherein determining a current view on a display comprises sensing a direction in which a user's face is pointing, and wherein selecting a command comprises selecting a command for the gesture and the voice command.

12. An apparatus comprising:
an object and gesture recognition system to receive an air gesture;
a gesture to view and screen synchronization module to determine a selected display and a current view on the selected display and to load a gesture library for the selected display and the current view;
the object and gesture recognition module to select a command for the gesture from the loaded gesture library corresponding to the selected display and the current view; and
a command execution module to execute the selected command.

13. The apparatus of claim 12, further comprising a direction of attention module to determine the display selection for the gesture to view and synchronization module by determining a direction in which a user's face is pointed.

14. The apparatus of claim 13, wherein the direction of attention module determines a direction in which the user's eyes are pointed.

15. A method comprising:
generating a three dimensional space having a plurality of objects in different positions relative to a user and a virtual object to be manipulated by the user;
presenting, on a display, a displayed area having at least a portion of the plurality of different objects;
detecting an air gesture of the user against the virtual object, the virtual object being outside the displayed area;
generating a trajectory of the virtual object in the three-dimensional space based on the air gesture, the trajectory including interactions with objects of the plurality of objects in the three-dimensional space; and
presenting a portion of the generated trajectory on the displayed area.

16. The method of claim 15, wherein the displayed area corresponds to a range of distances from the user in the three dimensional space and wherein presenting a portion of the generated trajectory comprises presenting the portion of the trajectory of the virtual object that is within the range of distances.

17. The method of claim 15, wherein generating the three dimensional space comprises generating a three dimensional space having objects that are closer to the user than the objects presented on the displayed area and wherein generating a trajectory comprises including interactions with objects that are not presented in the displayed area.

18. The method of claim 15, wherein the included interactions include a model of acceleration forces.

19. The method of claim 18, wherein the acceleration forces include at least one of gravity, electromagnetism, and spring forces.

20. The method of claim 18, wherein presenting a displayed area comprises presenting a representation of the relative amount of acceleration force attributed to objects of the displayed area.

21. The method of claim 15, wherein the included interactions include a model of surface tension.

22. The method of claim 15, wherein the included interactions include solid body collision.

23. The method of claim 15, wherein generating a three dimensional space comprises determining interactions between objects of the plurality of objects over time and presenting position changes caused by the interactions over time in the three dimensional space on the displayed area.

24. The method of claim 15, further comprising:
determining a position of a second display;
correlating the determined position with the three dimensional space; and
presenting, on the second display, a second displayed area having a second portion of the plurality of different object of the three dimensional space.

25. The method of claim 24, wherein determining the position of the second display comprises determining the position of the second display using a camera and the position of the first display.

26. The method of claim 24, wherein determining the position of the second display comprises determining the position of the second display using a radio transceiver coupled to the second display.

27. The method of claim 15, wherein the displayed area is presented by the display as three-dimensional images.

28. A non-transitory machine-readable medium having instructions stored thereon which, when executed by a computer, cause the computer to perform operations comprising:
generating a three dimensional space having a plurality of objects in different positions relative to a user and a virtual object to be manipulated by the user;
presenting, on a display, a displayed area having at least a portion of the plurality of different objects;
detecting an air gesture of the user against the virtual object, the virtual object being outside the displayed area;
generating a trajectory of the virtual object in the three-dimensional space based on the air gesture, the trajectory including interactions with objects of the plurality of objects in the three-dimensional space; and
presenting a portion of the generated trajectory on the displayed area.

29. The medium of claim 28, the operations further comprising:
determining a position of a second display;
correlating the determined position with the three dimensional space; and
presenting, on the second display, a second displayed area having a second portion of the plurality of different object of the three dimensional space.

30. The medium of claim 29, wherein the displayed area is presented by the display as three-dimensional images.

31. An apparatus comprising:
an object velocity and direction module to generate a three dimensional space having a plurality of objects in different positions relative to a user and a virtual object to be manipulated by the user;
a screen rendering module to present, on a display, a displayed area having at least a portion of the plurality of different objects;
an object and gesture recognition system to detect an air gesture of the user against the virtual object, the virtual object being outside the displayed area;
a virtual object behavior module to generate a trajectory of the virtual object in the three-dimensional space based on the air gesture, the trajectory including interactions with objects of the plurality of objects in the three-dimensional space; and
the screen rendering module to present a portion of the generated trajectory on the displayed area.

32. The apparatus of claim 31, wherein the displayed area corresponds to a range of distances from the user in the three dimensional space, the apparatus further comprising a three-dimensional (3D) image interaction and effects module to present the portion of the trajectory of the virtual object that is within the range of distances.

33. The apparatus of claim 32, wherein the object velocity and direction module generates a three dimensional space having objects that are closer to the user than the objects presented on the displayed area and wherein the virtual object behavior module generates a trajectory that includes interactions with objects that are not presented in the displayed area.

* * * * *